United States Patent
Suzuki et al.

(10) Patent No.: US 9,639,489 B2
(45) Date of Patent: May 2, 2017

(54) I/O DEVICE SHARING SYSTEM AND I/O DEVICE SHARING METHOD

(71) Applicant: NEC Corporation, Minato-ku, Tokyo (JP)

(72) Inventors: Jun Suzuki, Tokyo (JP); Youichi Hidaka, Tokyo (JP); Masato Yasuda, Tokyo (JP); Takashi Yoshikawa, Tokyo (JP); Junichi Higuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/389,807

(22) PCT Filed: Apr. 3, 2013

(86) PCT No.: PCT/JP2013/002316
§ 371 (c)(1),
(2) Date: Oct. 1, 2014

(87) PCT Pub. No.: WO2013/150792
PCT Pub. Date: Oct. 10, 2013

(65) Prior Publication Data
US 2015/0095518 A1    Apr. 2, 2015

(30) Foreign Application Priority Data

Apr. 6, 2012  (JP) ................................. 2012-087888

(51) Int. Cl.
*G06F 3/00*    (2006.01)
*G06F 13/38*   (2006.01)
(Continued)

(52) U.S. Cl.
CPC .......... *G06F 13/385* (2013.01); *G06F 13/105* (2013.01); *G06F 13/4022* (2013.01); *G06F 13/4221* (2013.01)

(58) Field of Classification Search
None
See application file for complete search history.

(56) References Cited

U.S. PATENT DOCUMENTS

| 7,669,020 | B1 * | 2/2010 | Shah | G06F 11/1458 |
| | | | | 711/162 |
| 7,979,592 | B1 * | 7/2011 | Pettey | G06F 13/404 |
| | | | | 709/205 |

(Continued)

FOREIGN PATENT DOCUMENTS

| JP | 2009-301162 A | 12/2009 |
| JP | 2010-79816 A | 4/2010 |

(Continued)

OTHER PUBLICATIONS

International Search Report for PCT Application No. PCT/JP2013/002316, mailed on May 14, 2013.

*Primary Examiner* — Elias Mamo

(57) ABSTRACT

An I/O device sharing system characterized by comprising: an I/O device (50) shared by a plurality of hosts (20-1 to 20-N); a system manager (10) which sets the I/O device (50); a virtual bridge (40) which virtualizes the I/O device (50); and a network (3) which connects the I/O device (50), the system manager (10), the plurality of hosts (20-1 to 20-N) and the virtual bridge (40) to each other, wherein the virtual bridge (40) includes a connection virtualization unit (41) by which it is detected that an address setting of a plurality of virtual functions provided in the I/O device (50) that is set by the system manager (10) is performed, the virtual function is enabled, or both of them are performed and each host is permitted to access each virtual function.

6 Claims, 7 Drawing Sheets

(51) Int. Cl.
*G06F 13/10* (2006.01)
*G06F 13/40* (2006.01)
*G06F 13/42* (2006.01)

(56) References Cited

U.S. PATENT DOCUMENTS

| | | | | |
|---|---|---|---|---|
| 2006/0195642 A1* | 8/2006 | Arndt | .................... | G06F 9/5016 |
| | | | | 710/240 |
| 2006/0242354 A1* | 10/2006 | Johnsen | ................ | G06F 13/404 |
| | | | | 710/316 |
| 2010/0017549 A1* | 1/2010 | Harriman | ............ | G06F 13/4022 |
| | | | | 710/104 |
| 2010/0125653 A1* | 5/2010 | Cherian | .............. | G06F 13/4004 |
| | | | | 709/223 |
| 2011/0179214 A1* | 7/2011 | Goggin | ................... | G06F 3/061 |
| | | | | 711/6 |

FOREIGN PATENT DOCUMENTS

| | | |
|---|---|---|
| JP | 2011-14023 A | 1/2011 |
| JP | 2012-48546 A | 3/2012 |
| WO | 2009/025381 A1 | 2/2009 |

* cited by examiner

I/O DEVICE SHARING SYSTEM AND I/O DEVICE SHARING METHOD

This application is a National Stage Entry of PCT/JP2013/002316 filed on Apr. 3, 2013, which claims priority from Japanese Patent Application 2012-087888 filed on Apr. 6, 2012, the contents of all of which are incorporated herein by reference, in their entirety.

TECHNICAL FIELD

The present invention relates to an Input/Output (I/O) device sharing system and an I/O device sharing method and in particular, relates to an I/O device sharing system which can simplify management of an I/O device and an I/O device sharing method.

BACKGROUND ART

One example of the I/O device sharing system is described in PTL 1. The I/O device sharing system shown in FIG. 7 includes a plurality of hosts (hereinafter, these hosts are described as a host 2-1 (a host 1), a host 2-2 (a host 2), ..., and a host 2-N (a host N)), an I/O device 5 corresponding to SR-IOV, an I/O virtual bridge 6, and a network 3. The I/O device 5 corresponding to SR-IOV conforms to the Single-Root I/O Virtualization (SR-IOV) standard shared by the hosts 2-1 to 2-N. The I/O virtual bridge 6 virtualizes the I/O device 5 corresponding to SR-IOV. The network 3 connects the hosts 2-1 to 2-N and the I/O virtual bridge 6.

The host 2-1 includes a CPU 201-1, a memory 203-1, a host PCIe bridge 204-1, and a route complex 202-1. The CPU 201-1 operates according to a program. The memory 203-1 stores the program and data. The host PCIe bridge 204-1 connects a PCI Express (PCIe) bus that is an I/O bus of the host 2-1 and the network 3. The route complex 202-1 connects the CPU 201-1, the memory 203-1, and the host PCIe bridge 204-1 to each other. The host PCIe bridge 204-1 encapsulates a PCIe packet in a network packet and decapsulates the PCIe packet encapsulated in the network packet. All the hosts 2-1 to 2-N have the same configuration.

The I/O device 5 corresponding to SR-IOV holds a Physical Function (PF) 501 that is an interface for controlling the device and a plurality of Virtual Functions (VFs) that are interfaces to provide the function of the I/O device. Hereinafter, a plurality of the VFs are described as the VF 502-1 (VF1) to the VF 502-N (VFN). The PF 501 holds a PF configuration register (PF_CFG_REG) 5011 for setting the PF 501. The VF 502-1 is used by the host 2-1. Similarly, the VFs 502-2 to 502-N are used by the hosts 2-2 to 2-N, respectively. Accordingly, the I/O device 5 corresponding to SR-IOV is shared by the hosts 2-1 to 2-N.

The I/O virtual bridge 6 includes a network connection unit 601 which transmits/receives the PCIe packet to/from the network 3, a packet transfer unit 602 which transfers the PCIe packet, an address conversion unit 603 which performs conversion of a destination address of the PCIe packet, and a connection virtualization unit 604 which performs a setting of the I/O device 5 corresponding to SR-IOV.

The network connection unit 601 decapsulates the PCIe packet that is encapsulated in the packet of the network 3. The network connection unit 601 encapsulates the PCIe packet in the packet of the network 3 and transmits it to the network 3.

The connection virtualization unit 604 accesses the PF_CFG_REG 5011 and performs the setting of the I/O device 5 corresponding to SR-IOV before the I/O device 5 corresponding to SR-IOV is used by the hosts 2-1 to 2-N. At this time, the address of the I/O device 5 corresponding to SR-IOV is set.

The address conversion unit 603 converts the address of the PCIe packet with respect to the access from the hosts 2-1 to 2-N to the I/O device 5 corresponding to SR-IOV. Specifically, the address conversion unit 603 performs the address conversion in which the addresses of the VFs 502-1 to 502-N that are set by the hosts 2-1 to 2-N are converted into the addresses of the VFs 502-1 to 502-N that are set by the connection virtualization unit 604, respectively.

The I/O device sharing system having the above-mentioned configuration operates as follows.

In the following explanation, a case in which the host 2-1 accesses the VF 502-1 will be explained as an example. The following explanation can be applied to a case in which the hosts 2-2 to 2-N access the VFs 502-2 to 502-N, respectively. When the CPU 201-1 which operates according to software in the host 1 issues an instruction to access the VF 502-1, the route complex 202-1 creates the PCIe packet addressed to a memory address to which the VF 502-1 is mapped and transmits it. The host PCIe bridge 204-1 encapsulates the PCIe packet in the network packet and transmits it to the network 3. The network connection unit 601 receives the network packet, decapsulates the PCIe packet, and transfers it to the packet transfer unit 602.

The packet transfer unit 602 transfers the received PCIe packet to the address conversion unit 603. The address conversion unit 603 converts the destination address designated by the host 2-1 into the address of the VF 502-1 that is set to the PF 501 by the connection virtualization unit 604 and transmits the PCIe packet to the VF 502-1. As a result, the VF 502-1 receives the PCIe packet issued by the host 2-1. Further, when the host 2-1 receives the PCIe packet transmitted by the VF 502-1, the above-mentioned processes are performed in reverse order.

CITATION LIST

Patent Literature

PTL 1: International publication No. 2009/025381

SUMMARY OF INVENTION

Technical Problem

However, the system described in PTL 1 has a problem in which management of the I/O device that is performed by the I/O virtual bridge is complicated. The reason is because each I/O device has a specific setting process and in order to respond to the various I/O devices, the specific setting process of each I/O device needs to be realized by the I/O virtual bridge.

An object of the present invention is to provide an I/O device sharing system which can simplify management of an I/O device that is performed by an I/O virtual bridge and an I/O device sharing method.

Solution to Problem

According to the present invention, there is provided an I/O device sharing system characterized by comprising: an I/O device shared by a plurality of hosts; a system manager which sets the I/O device; a virtual bridge which virtualizes the I/O device; and a network which connects the I/O device, the system manager, the plurality of hosts, and the virtual bridge to each other, wherein the virtual bridge includes a connection virtualization unit by which it is detected that an address setting of a plurality of virtual functions provided in the I/O device that is set by the system manager is performed, the virtual function is enabled, or both of them are performed and each host is permitted to access each virtual function.

According to the present invention, there is provided an I/O device sharing method characterized by comprising: connecting an I/O device and a network via a virtual bridge which virtualizes the I/O device, connecting a system manager which sets the I/O device and a plurality of hosts which share the I/O device with the network, and detecting that an address setting of a plurality of virtual functions held by the I/O device that is set by the system manager is performed, the virtual function is enabled, or both of them are performed and permitting each host to access each virtual function.

Advantageous Effect of Invention

The present invention has an effect in which management of the I/O device that is performed by the I/O virtual bridge can be simplified. The reason is because in the management of the I/O device, only the management applied to all the I/O devices is performed by the I/O virtual bridge and the other management that is used for a process individually performed by each I/O device is performed by a system manager. Namely, the process performed by each I/O device excluding the common process is performed by the system manager connected through a network by using a software provided by a manufacturer of the I/O device.

DESCRIPTION OF EMBODIMENTS

Figure 1:
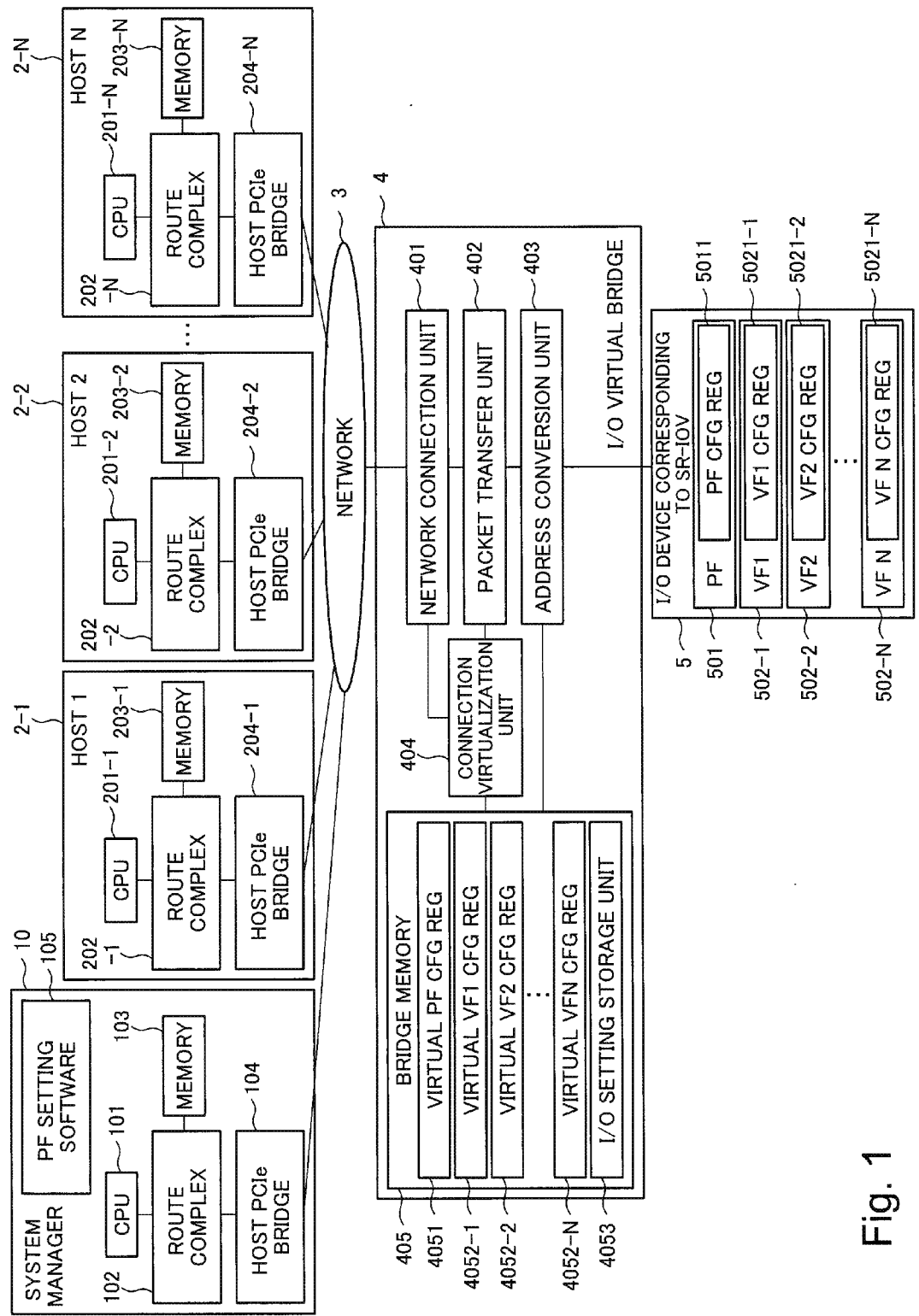
FIG. 1 is a block diagram showing a configuration of one exemplary embodiment of an I/O device sharing system according to the present invention.

An exemplary embodiment of the present invention will be described in detail below with reference to the drawing.

FIG. 1 is a block diagram showing a configuration of one exemplary embodiment of an I/O device sharing system according to the present invention. The I/O device sharing system shown in FIG. 1 includes a system manager 10, hosts 2-1 to 2-N, an I/O device 5 corresponding to SR-IOV, an I/O virtual bridge 4, and a network 3. The system manager 10 controls the I/O device 5 corresponding to SR-IOV. The hosts 2-1 to 2-N share the I/O device 5 corresponding to SR-IOV. The I/O virtual bridge 4 connects the I/O device corresponding to SR-IOV and the network 3. The network 3 connects the system manager 10, the hosts 2-1 to 2-N, and the I/O virtual bridge 4 to each other.

The system manager 10 includes a CPU 101, a memory 103, a host PCIe bridge 104, a route complex 102, and a PF setting software 105. The CPU 101 operates according to software. The memory 103 stores a program and data. The host PCIe bridge 104 connects a PCIe bus and the network 3. The route complex 102 connects the CPU 101, the memory 103, and the host PCIe bridge 104 to each other. The PF setting software 105 controls a PF 501 of the I/O device 5 corresponding to SR-IOV.

Further, the PF 501 corresponds to one example of a control function for controlling a virtual function.

The PF setting software 105 includes a device driver which operates in kernel space, an OS, and a PF setting user software which operates in user space. The PF setting user software is generally provided by a manufacturer which provides the I/O device 5 corresponding to SR-IOV as a series of software programs which control the device together with the device. The PF setting user software may be provided by the operating system which operates in the system manager 10.

The I/O device 5 corresponding to SR-IOV holds the PF 501 that is an interface which controls the device and VFs 502-1 to 502-N that are the interfaces which provide a function of the I/O device. The PF 501 holds a PF_CFG_REG 5011 for setting the PF 501. The VF 502-1 holds a VF configuration register (VF CFG REG) 5021-1 (VF1 CFG REG) for setting the VF 502-1. All the VFs 502-1 to 502-N have the same configuration. The VF 502-1 is used by the host 2-1. Similarly, the VFs 502-2 to 502-N are used by the hosts 2-2 to 2-N, respectively. Accordingly, the I/O device 5 corresponding to SR-IOV is shared by the hosts 2-1 to 2-N.

The I/O virtual bridge 4 includes a network connection unit 401, a packet transfer unit 402, an address conversion unit 403, a connection virtualization unit 404, and a bridge memory 405. The network connection unit 401 transmits/receives the PCIe packet to/from the network 3. The packet transfer unit 402 transfers the PCIe packet. The address conversion unit 403 performs conversion of the destination address of the PCIe packet. The connection virtualization unit 404 performs a setting of the I/O device 5 corresponding to SR-IOV. The bridge memory 405 stores the setting of the I/O device 5 corresponding to SR-IOV.

The network connection unit 401 decapsulates the PCIe packet encapsulated in the packet of the network 3. The network connection unit 401 encapsulates the PCIe packet in the packet of the network 3 and transmits it to the network 3.

The bridge memory 405 includes a virtual PF_CFG_REG 4051, a virtual VF1 CFG REG 4052-1 to a virtual VFN CFG REG 4052-N, and an I/O setting storage unit 4053. The virtual PF_CFG_REG 4051 simulates the PF_CFG_REG 5011. The virtual VF1 CFG REG 4052-1 to the virtual VFN CFG REG 4052-N simulate the VF1 CFG REG 5021-1 to the VFN CFG REG 5021-N, respectively. The I/O setting storage unit 4053 stores the setting of the I/O device 5 corresponding to SR-IOV that is performed by the connection virtualization unit 404.

Figure 2:
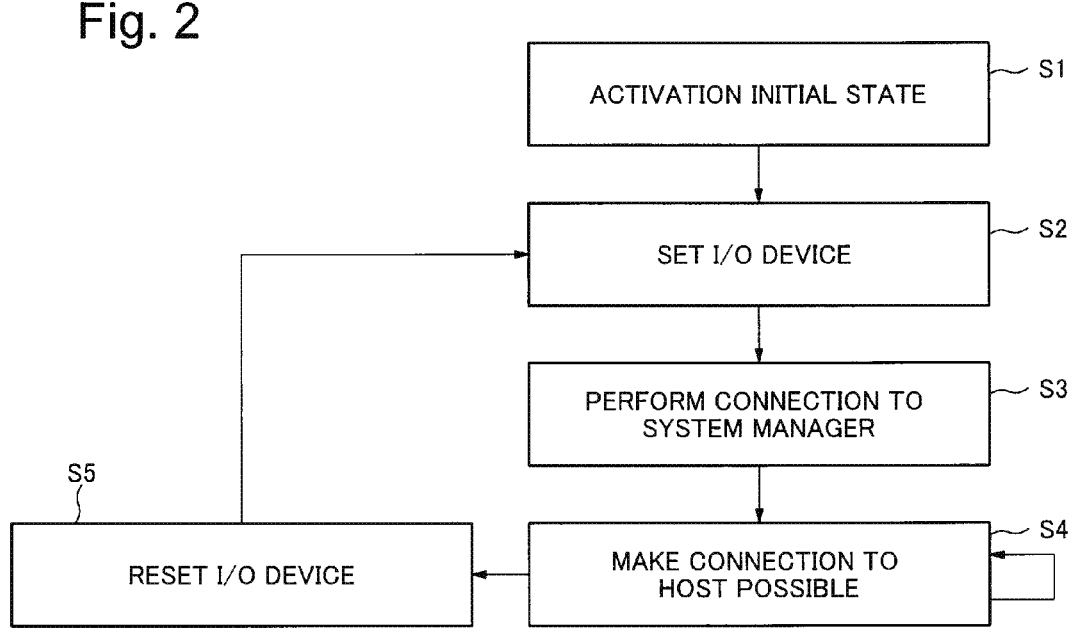
FIG. 2 is a state machine diagram showing a state transition of a connection virtualization unit.

The connection virtualization unit 404 operates according to a state machine shown in FIG. 2.

An activation initial state S1 is a first state in which the I/O virtual bridge 4 is activated. At this time, the I/O virtual bridge 4 reads a parameter which specifies the operation of the connection virtualization unit 404 from a setting storage medium. The state of the I/O virtual bridge 4 changes to an I/O device setting state S2.

In the I/O device setting state S2, the connection virtualization unit 404 accesses the PF_CFG_REG 5011 of the I/O device 5 corresponding to SR-IOV that is set by the system manager 10, sets the addresses of the PF 501 and the VFs 502-1 to 502-N, and enables the VFs 502-1 to 502-N.

Figure 3:
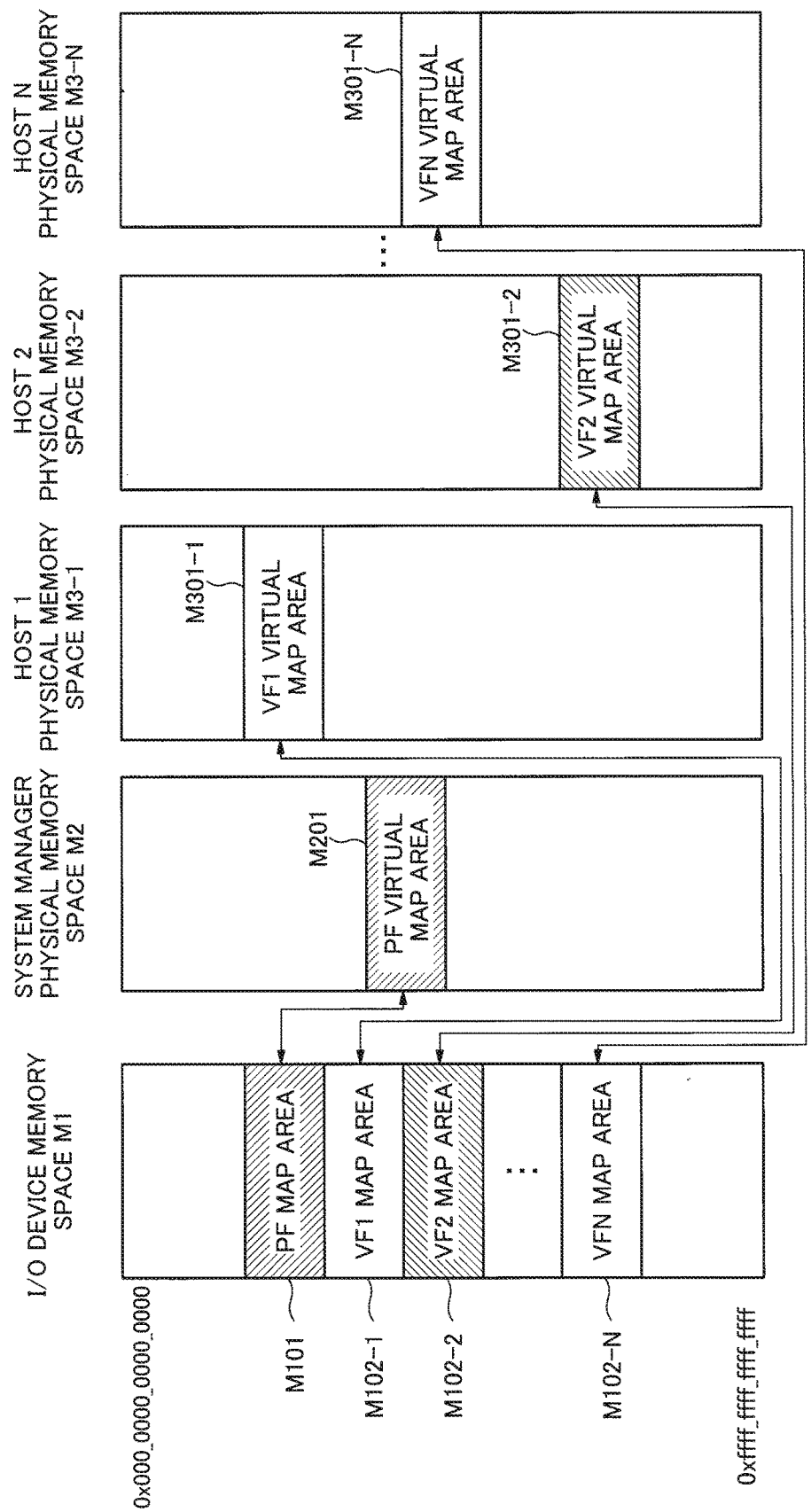
FIG. 3 is a figure for explaining an address setting performed by a connection virtualization unit.

The address setting performed by the connection virtualization unit 404 will be described with reference to FIG. 3. The connection virtualization unit 404 creates an I/O device memory space M1. In the space M1, the connection virtualization unit 404 maps the PF 501 in a PF map area M101. Further, the connection virtualization unit 404 maps the VFs 502-1 to 502-N in a VF1 map area M102-1 to a VFN map area M102-N, respectively. Namely, the connection virtualization unit 404 sets the address to the virtual function and the control function. The register used for setting this map is held in the PF_CFG_REG 5011. The connection virtualization unit 404 stores the setting value of the PF 501 in the I/O setting storage unit 4053. The state of the connection virtualization unit 404 changes to a system manager connection state S3.

In the system manager connection state S3, the access to the PF 501 that is performed by the system manager 10 is permitted. Specifically, the connection virtualization unit 404 makes the network connection unit 401 establish the connection between the host PCIe bridge 104 and the network connection unit 401 so that the system manager 10 can access the PF 501.

When the connection between the system manager 10 and the I/O device 5 corresponding to SR-IOV is established, software operated by the system manager 10 issues the configuration access to the I/O device 5 corresponding to SR-IOV and performs the configuration. The configuration access includes a configuration write access and a configuration reed access by the PCIe packet. The configuration access of the system manager 10 is transferred to the connection virtualization unit 404 by the packet transfer unit 402.

Next, the connection virtualization unit 404 writes the setting of the system manager 10 to the virtual PF_CFG_REG 4051. By this access, the system manager 10 maps the PF 501 in a PF virtual map area M201 of a system manager physical memory space M2. Namely, the system manager 10 sets the address of the control function for controlling the virtual function. In the configuration access to the virtual PF_CFG_REG 4051 that is performed by the system manager 10, when it is detected by the connection virtualization unit 404 that the VFs 502-1 to 502-N are enabled, the state of the connection virtualization unit 404 changes to a host connection possible state S4. When it is detected by the connection virtualization unit 404 that the address setting of the VFs 502-1 to 502-N is performed or the address setting of them is performed and the VFs 502-1 to 502-N are enabled, the state of the connection virtualization unit 404 may change to the host connection possible state S4.

The host connection possible state S4 is a state in which the hosts 2-1 to 2-N can use the VF 502-1 to 502-N, respectively. The function with respect to the host 2-1 of the connection virtualization unit 404 will be described below. Similarly, the function of the hosts 2-2 to 2-N can be described.

The connection virtualization unit 404 establishes the connection between the network connection unit 401 and the host PCIe bridge 204-1 and controls the network connection unit 401 so that the host 2-1 can communicate with the VF 502-1. After the connection is established, first, the host 2-1 issues the configuration access to the VF1 CFG REG 5021-1 and performs the configuration of the VF 502-1 (VF1). The configuration access issued by the host 2-1 is transferred to the connection virtualization unit 404 by the packet transfer unit 402. The connection virtualization unit 404 writes the setting of the host 2-1 to the virtual VF1 CFG REG 4052-1. By this setting, as shown in FIG. 3, the host 2-1 maps the VF 502-1 in a VF1 virtual map area M301-1 of a host 1 physical memory space M3-1. Namely, the host 2-1 performs the address setting to the virtual function. As a result, the host 2-1 can perform the memory access to the VF 502-1. Further, the host 2-1 can use the VF 502-1.

The host connection possible state S4 is a steady state for providing a service in which the I/O device 5 corresponding to SR-IOV is shared by the hosts 2-1 to 2-N. Unless an event such as a system error, a release of the connection between the host PCIe bridge 104 and the network connection unit 401, or the like occurs, the state of the connection virtualization unit 404 is maintained to the host connection possible state S4. When the connection between the host PCIe bridge 104 and the network connection unit 401 is released, the state of the connection virtualization unit 404 changes to an I/O device reset state S5.

In the I/O device reset state S5, the connection virtualization unit 404 controls the network connection unit 401 so that the connections between the network connection unit 401 and the hosts 2-1 to 2-N are released (the connections are cut off). The connection virtualization unit 404 resets the I/O device 5 corresponding to SR-IOV. After the reset, the state of the connection virtualization unit 404 changes to the I/O device setting status S2, the process is returned to the process in which the setting of the I/O device 5 corresponding to SR-IOV is performed, and the above-mentioned processes are performed again.

The address conversion unit 403 performs conversion of the address described in the header of the PCIe packet transmitted and received between the system manager 10 and the PF 501. The address conversion unit 403 performs conversion of the address described in the header of the PCIe packet transmitted and received between the hosts 2-1 to 2-N and the VFs 502-1 to 502-N used by the hosts 2-1 to 2-N, respectively. For example, as shown in FIG. 3, the PF 501 is mapped in the PF map area M101 of the I/O device memory space M1. Further, the PF 501 is mapped in the PF virtual map area M201 of the system manager physical memory space M2. In that case, the address conversion unit 403 performs the address conversion corresponding to a difference between map values of these two address spaces. Similarly, the VF 502-1 is mapped in the VF1 map area M102-1 of the I/O device memory space M1. Further, the VF 502-1 is mapped in the VF1 virtual map area M301-1 of the host 1 physical memory space M3-1. In this case, the address conversion unit 403 performs the address conversion of these two address spaces. Similarly, the address conversion unit 403 performs the address conversion with respect to the VFs 502-2 to 502-N.

When the address conversion unit 403 performs the address conversion of the PCIe packet passing through the address conversion unit 403, the address conversion unit 403 refers to information of the I/O device memory space M1, the system manager physical memory space M2, and the host 1 physical memory space M3-1 to the host N physical memory space M3-N that are stored in the bridge memory 405. These information are obtained from the information stored in the virtual PF_CFG_REG 4051, the virtual VF1

CFG REG 4052-1 to the virtual VFN CFG REG 4052-N, and the I/O setting storage unit 4053.

The I/O device sharing system according to this exemplary embodiment operates as follows based on the above-mentioned configuration.

Figure 4:
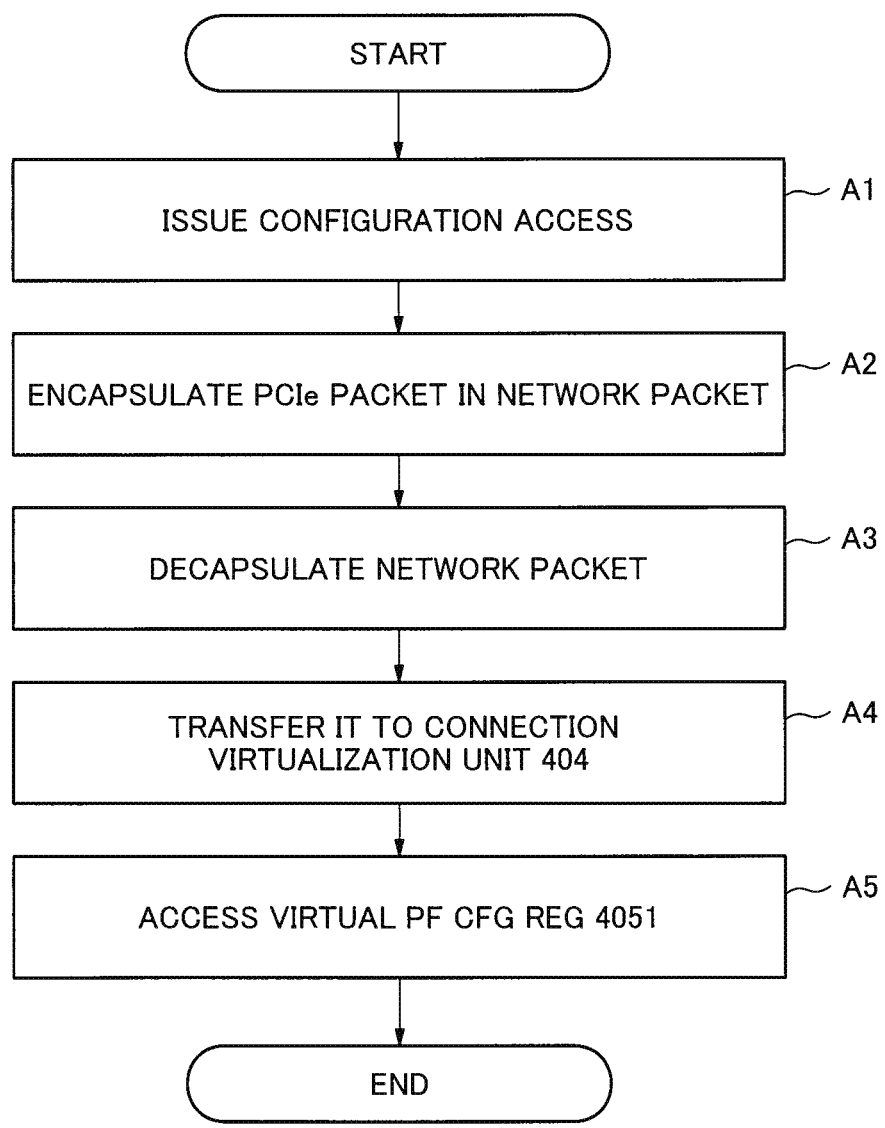
FIG. 4 is a flowchart showing an operation of a case in which a system manager issues a configuration access to a PF.

First, operation of a case in which the system manager 10 issues the configuration access to the PF 501 will be described with reference to FIG. 1 and FIG. 4.

The configuration access is the configuration write request or the configuration read request. When the PF setting software 105 operated by the system manager 10 issues the configuration access to the PF 501 (Step A1), the PCIe packet is created by the route complex 102. The PCIe packet is transmitted to the host PCIe bridge 104.

The host PCIe bridge 104 encapsulates the PCIe packet in the packet of the network 3 and transmits it to the network 3 (Step A2). The network connection unit 401 receives the packet in which the PCIe packet is encapsulated. The network connection unit 401 decapsulates the network packet and transmits it to the packet transfer unit 402 (Step A3). The packet transfer unit 402 confirms that the PCIe packet is the configuration access by the system manager 10 and transfers it to the connection virtualization unit 404 (Step A4). When it is determined that the request is the write request based on the received configuration access, the connection virtualization unit 404 writes the setting value into the virtual PF_CFG_REG 4051. When it is determined that the request is the read request, the connection virtualization unit 404 reads the setting value designated from the virtual PF_CFG_REG 4051 and transmits a reply to the system manager 10 (Step A5).

Figure 5:
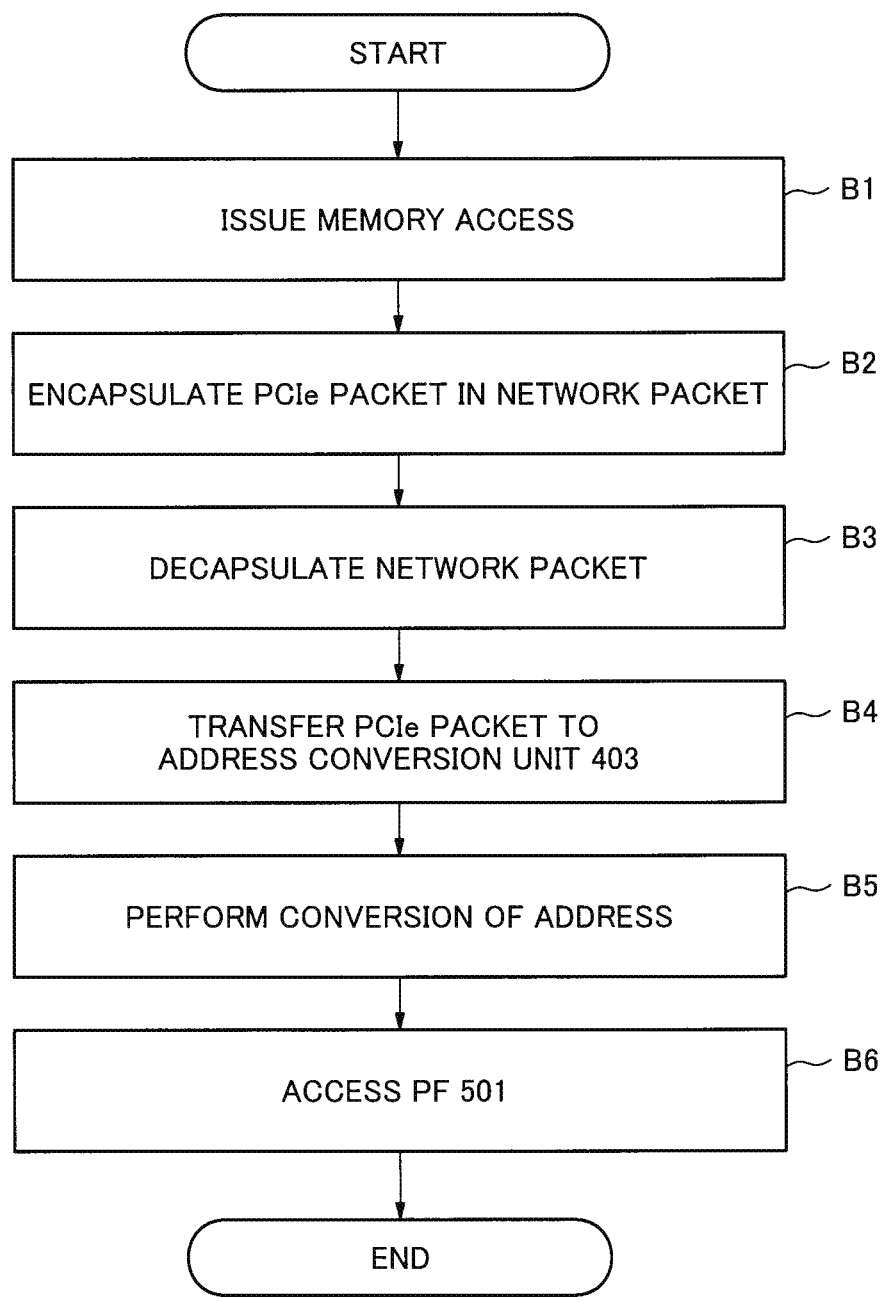
FIG. 5 is a flowchart showing an operation of a case in which a system manager performs a memory access to an area in which a PF is memory-mapped.

Next, operation of a case in which the system manager 10 performs the memory access to the area in which the PF 501 is memory-mapped will be described with reference to FIG. 1 and FIG. 5.

The memory access is the memory write request or the memory read request. When the PF setting software 105 which operates by the system manager 10 issues the memory access to the PF 501 (Step B1), the PCIe packet addressed to the PF virtual map area M201 is created by the route complex 102. The PCIe packet is transmitted to the host PCIe bridge 104. The host PCIe bridge 104 encapsulates the PCIe packet in the packet of the network 3 and transmits it to the network 3 (Step B2). The network connection unit 401 receives the network packet in which the PCIe packet is encapsulated, decapsulates the PCIe packet, and transmits it to the packet transfer unit 402 (Step B3).

The packet transfer unit 402 confirms that the PCIe packet is the memory access by the system manager 10 and transfers the PCIe packet to the address conversion unit 403 (Step B4).

The address conversion unit 403 performs conversion of the destination address of the PCIe packet from the PF virtual map area M201 to the PF map area M101 by using the value stored in the virtual PF_CFG_REG 4051 which holds the setting value of the PF virtual map area M201 and the value stored in the I/O setting storage unit 4053 which holds the setting value of the PF map area M101 in the bridge memory 405. The address conversion unit 403 transmits the PCIe packet to the I/O device 5 corresponding to SR-IOV (Step B5). As a result, the PF 501 receives the memory access issued by the system manager 10. When the memory access is the memory write request, the PF 501 writes the designated data and when it is the memory read request, the PF 501 reads the designated data and transmits a reply to the system manager 10 (Step B6).

Figure 6:
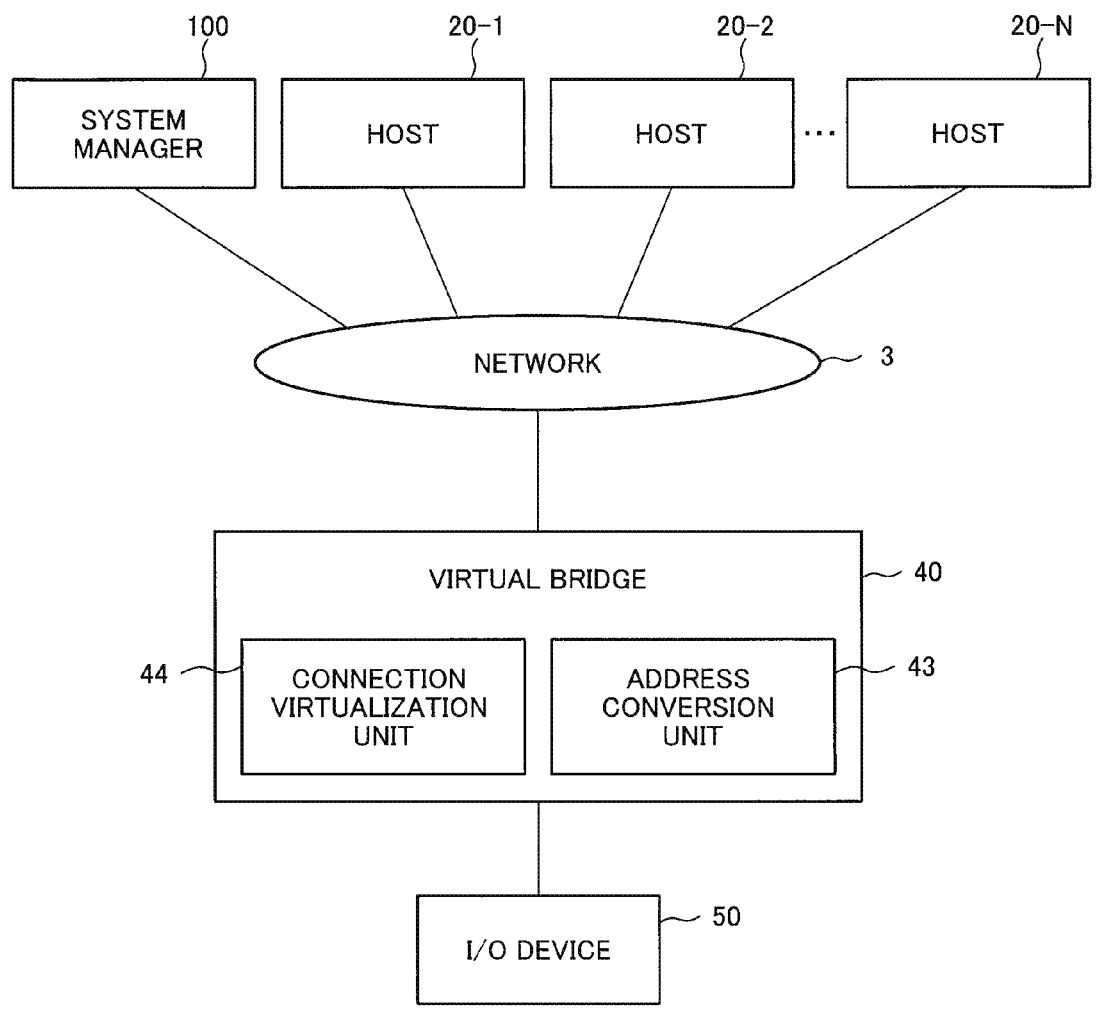
FIG. 6 is a block diagram showing a main portion of an I/O device sharing system according to the present invention.
Figure 7:
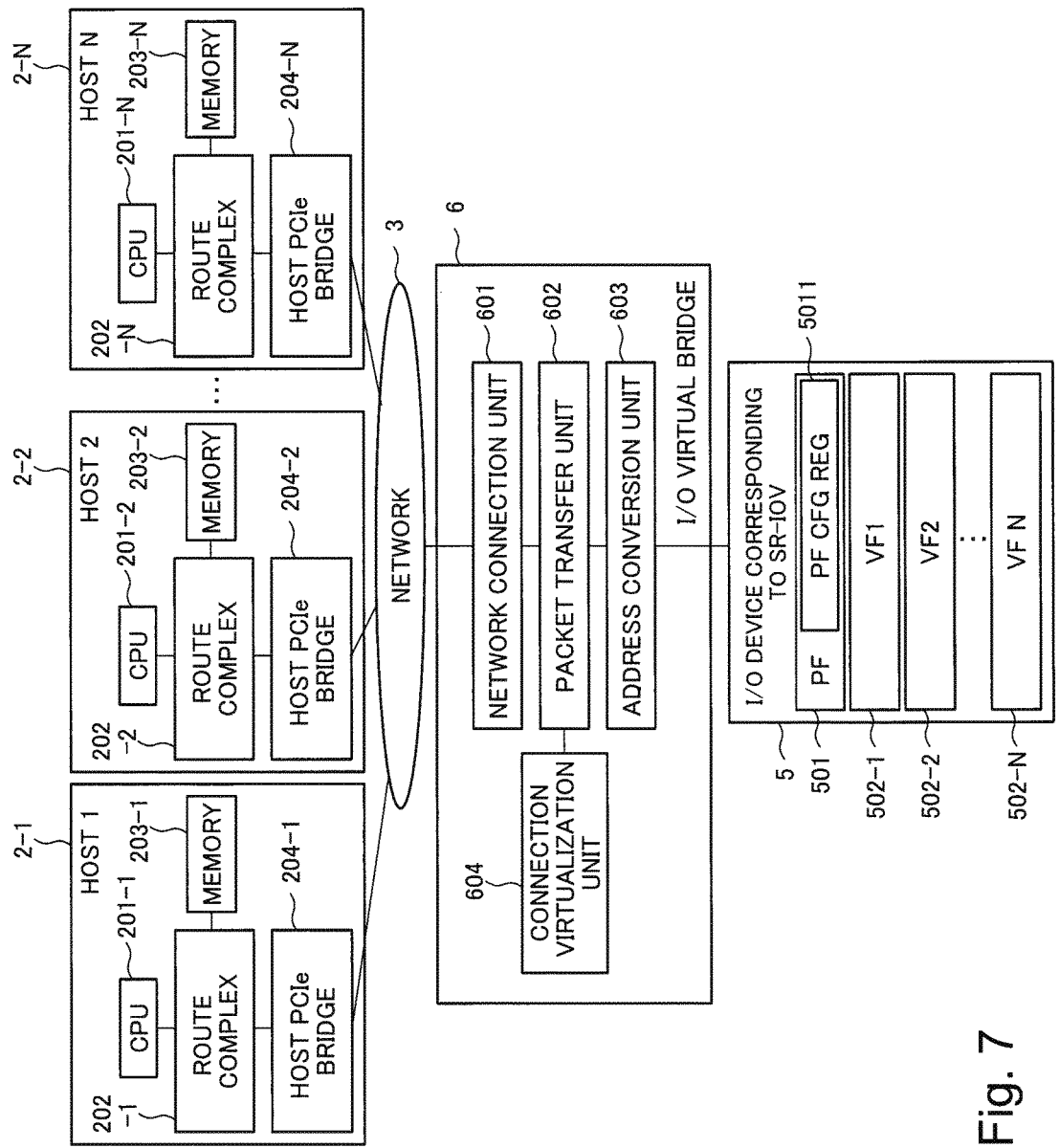
FIG. 7 is a block diagram showing a configuration of an I/O device sharing system described in PLT 1.

FIG. 6 is a block diagram showing a main portion of the I/O device sharing system according to the present invention. As shown in FIG. 6, the I/O device sharing system includes an I/O device 50 (for example, the I/O device 5 corresponding to SR-IOV shown in FIG. 1), a system manager 100 (for example, the system manager 10 shown in FIG. 1), a virtual bridge 40 (for example, the I/O virtual bridge 4 shown in FIG. 1), and the network 3.

The I/O device 50 is shared by a plurality of hosts 20-1 to 20-N (for example, the hosts 2-1 to 2-N shown in FIG. 1). The system manager 100 sets the I/O device 50. The virtual bridge 40 virtualizes the I/O device 50. The network 3 connects the I/O device 50, the system manager 100, a plurality of the hosts 20-1 to 20-N, and the virtual bridge 40 to each other. The virtual bridge 40 includes a connection virtualization unit 44 (for example, the connection virtualization unit 404 shown in FIG. 1). When it is detected by the connection virtualization unit 44 that the address setting of a plurality of the virtual functions provided in the I/O device 50 that is set by the system manager 100 is performed, the virtual function is enabled, or both of them are performed, the connection virtualization unit 44 permits each of the hosts 20-1 to 20-N to access each virtual function.

The virtual bridge 40 further includes an address conversion unit 43. With respect to the address described in the packet of the I/O bus that is transmitted and received between each of the hosts 20-1 to 20-N and each of the virtual functions, the address conversion unit 43 performs the address conversion by referring to the address that is set to each virtual function by each of the hosts 20-1 to 20-N and the address that is actually set to each virtual function.

As described above, this exemplary embodiment has a configuration in which the I/O virtual bridge controls the PF_CFG_REG that is common to all the I/O devices and the system manager connected to the I/O device through the network controls the memory map area of the PF that depends on the individual I/O device by using the PF setting software provided by the manufacturer of the I/O device. Therefore, the management of the I/O device that is performed by the I/O virtual bridge can be simplified. Further, a configuration of a portion related to the management of the I/O device that is performed by the I/O virtual bridge can be simplified.

Further, in this exemplary embodiment, the bus based on the standard of the bus which conforms to the PCIe is used as the I/O bus. However, a bus based on a new I/O bus standard that will be developed by expanding the function of the PCIe in the future or a bus based on another I/O bus standard which operates in a similar manner can be used for the present invention.

In this exemplary embodiment, the number of the hosts 2-1 to 2-N is equal to the number of the VFs 502-1 to 502-N of the I/O device 5 corresponding to SR-IOV. However, the number of the hosts may not be necessarily equal to the number of the VFs. For example, an exemplary embodiment in which the number of VFs is greater than the number of the hosts and each host uses one of the VFs may be used.

The I/O device 5 corresponding to SR-IOV according to this exemplary embodiment is a device which conforms to the PCIe SR-IOV standard such as a network interface card, a storage device, a storage network card, a USB controller, and an I/O device for built-in apparatus.

The invention of the present application has been described above with reference to the exemplary embodiment and the example. However, the invention of the present application is not limited to the above mentioned exemplary embodiment and example. Various changes in the configuration or details of the invention of the present application that can be understood by those skilled in the art can be made without departing from the scope of the invention.

This application claims priority based on Japanese Patent Application 2012-087888 filed on Apr. 6, 2012, the disclosure of which is hereby incorporated by reference in its entirety.

INDUSTRIAL APPLICABILITY

The present invention can be applied to a use in which a single I/O device is shared by a plurality of computers in a computer system. Further, the present invention can be applied to a use in which a single I/O device is shared by a plurality of apparatuses in a built-in system.

REFERENCE SIGNS LIST 2-1 to 2-N host
3 network
4 I/O virtual bridge
5 I/O device corresponding to SR-IOV
10 system manager
20-1 to 20-N host
40 virtual bridge
43 address conversion unit
44 connection virtualization unit
50 I/O device
100 system manager
101 CPU
102 route complex
103 memory
104 host PCIe bridge
105 PF setting software
201-1 to 201-N CPU
202-1 to 201-N route complex
203-1 to 203-N memory
204-1 to 204-N host PCIe bridge
401 network connection unit
402 packet transfer unit
403 address conversion unit
404 connection virtualization unit
405 bridge memory
501 PF
502-1 to 501-N VF
601 network connection unit
602 packet transfer unit
603 address conversion unit
604 connection virtualization unit

What is claimed is:

1. An I/O device sharing system comprising:
an I/O device shared by a plurality of hosts;
a system manager which sets the I/O device and allows the I/O device to perform individual processes by using a software corresponding to the I/O device;
a virtual bridge which virtualizes the I/O device and performs management of common processes applied to the I/O device; and
a network which connects the I/O device, the system manager, the plurality of hosts, and the virtual bridge to each other,
wherein the virtual bridge includes:
a connection virtualization unit by which it is detected that an address setting of a plurality of virtual functions provided in the I/O device that is set by the system manager is performed, the virtual function is enabled, or both of them are performed and each host is permitted to access each virtual function; and
an address conversion unit which performs an address conversion by referring to an address that is set to each virtual function by each host and an address that is actually set to each virtual function with respect to the address described in a packet of an I/O bus that is transmitted and received between each host and each virtual function;
wherein the connection virtualization unit performs the address setting of the virtual function and the address setting of a control function for controlling the virtual function provided in the I/O device,
the virtual bridge includes a bridge memory which stores the address that is set to the virtual function and the control function by the connection virtualization unit, the address that is set to the control function by the system manager, and the address that is set to each virtual function by each host, and
the address conversion unit performs the address conversion by referring to the address that is set to the control function by the system manager and the address that is set to the control function by the connection virtualization unit with respect to the address described in the packet of an I/O bus that is transmitted and received between the system manager and the control function.

2. The I/O device sharing system described in claim 1 wherein, when the connection virtualization unit detects disconnection of the connection between the system manager and the virtual bridge, the connection virtualization unit cuts off the connections between a plurality of the hosts and the virtual bridge to stop a use of a plurality of the virtual functions by a plurality of the hosts and resets the I/O device.

3. The I/O device sharing system described in claim 1 wherein the I/O device conforms to a standard of PCI Express Single-Root I/O Virtualization.

4. An I/O device sharing method comprising:
connecting an I/O device and a network via a virtual bridge which virtualizes the I/O device and performs management of common processes applied to the I/O device,
connecting a system manager, which sets the I/O device and allows the I/O device to perform individual processes by using a software corresponding to the I/O device, with a plurality of hosts which share the I/O device with the network, and
detecting that an address setting of a plurality of virtual functions held by the I/O device that is set by the system manager is performed, the virtual function is enabled, or both of them are performed and permitting each host to access each virtual function,
wherein an address conversion is performed by referring to an address that is set to each virtual function by each host and an address that is actually set to each virtual function with respect to the address described in a packet of an I/O bus that is transmitted and received between each host and each virtual function,
wherein the virtual bridge performs the address setting of the virtual function and the address setting of a control function for controlling the virtual function provided in the I/O device,
the virtual bridge holds the address that is set to the virtual function and the control function, the address that is set to the control function by the system manager, and the address that is set to each virtual function by each host in a bridge memory, and the address conversion is performed by referring to the address that is set to the control function by the system manager and the address that is set to the control function by the virtual bridge with respect to the address described in the packet of the I/O bus that is transmitted and received between the system manager and the control function.

5. The I/O device sharing method described in claim 4 wherein, when the virtual bridge detects disconnection of the connection between the system manager and the virtual bridge, the virtual bridge cuts off the connections between a plurality of the hosts and the virtual bridge to stop a use of a plurality of the virtual functions by a plurality of the hosts and resets the I/O device.

6. The I/O device sharing method described in claim 4 wherein the I/O device conforms to a standard of PCI Express Single-Root I/O Virtualization.

* * * * *